INVENTORS,
ELLIOTT J. ROBERTS
WILLIAM C. WEBER
ANTHONY J. FISCHER
BY Arthur Middleton
ATTORNEY.

Jan. 25, 1944.   E. J. ROBERTS ET AL   2,340,226
SEDIMENTATION APPARATUS
Filed Dec. 31, 1941   3 Sheets-Sheet 2

INVENTORS
ELLIOTT J. ROBERTS
WILLIAM C. WEBER
ANTHONY J. FISCHER
BY
ATTORNEY

Jan. 25, 1944.	E. J. ROBERTS ET AL	2,340,226
SEDIMENTATION APPARATUS
Filed Dec. 31, 1941	3 Sheets-Sheet 3

INVENTORS,
ELLIOTT J. ROBERTS
WILLIAM C. WEBER
ANTHONY J. FISCHER
BY Arthur Middleton
ATTORNEY Patented Jan. 25, 1944

2,340,226

UNITED STATES PATENT OFFICE 2,340,226

SEDIMENTATION APPARATUS

Elliott J. Roberts and William C. Weber, Westport, Conn., and Anthony J. Fischer, Manhasset, N. Y., assignors to The Dorr Company, New York, N. Y., a corporation of Delaware Application December 31, 1941, Serial No. 425,016

6 Claims. (Cl. 210—3)

The present invention relates to apparatus for use in the purification of liquids containing suspended particles by the method of settling. More particularly, the invention relates to units or installations comprising settling apparatus such as clarifiers, thickeners or decanting tanks and the like.

Apparatus of this character, in one general form thereof, ordinarily employs a tank of relatively large superficial area as compared with its depth, and the liquid to be treated enters at a predetermined region of the tank, usually adjacent the center thereof, and moves slowly outwardly toward a peripheral discharge region while simultaneously depositing its suspended particles. The clarified effluent is drawn off by means of an overflow weir and launder which extends completely around the tank in the upper regions thereof. The solids which are deposited or which settle in the form of sediment on the bottom of the tank are impelled to a discharge region or section, usually to a depressed floor portion or sump, by means of travelling substantially radially extending arms that are equipped with raking blades which are so designed that upon rotation of the arms about a central vertical axis the settled solids are drawn slowly inwardly of the tank structure along the bottom thereof to the aforementioned sump.

In connection with settling apparatus of the general type set forth above, for maximum efficiency in the settling process, it is imperative that the incoming fluid be distributed as uniformly as possible over the entire settling area or zone and caused to flow slowly and uniformly without eddies or substantial change in direction outwardly toward the effluent region of the tank. It is also imperative that the solids which accumulate in the lower part of the tank be impelled inwardly toward a region of removal without substantially disturbing the fluid in the settling zone so that such solids do not intermingle with the purified effluent liquid.

Furthermore, where the purification of water and the treatment of sewage are concerned, in both of which cases the sediment contains a large amount of septic organics, it is highly important to avoid undue retention at any point in the tank and especially near its bottom where the sediment collects and is impelled toward a discharge. Otherwise the sedimentary matter may become septic and tend to rise, thus upsetting the entire functioning of the tank.

Heretofore, where settling apparatus of this type is concerned, particularly in the case of a tank employing a central feed and a radial flow of liquid, considerable difficulty has been encountered in obtaining uniform quiescence throughout the entire tank contents. This has been accounted for by the constant mixing of the water from the top to bottom and the formation of currents of sufficient velocity to lift and hold the solids in suspension. These currents are probably due mainly to the motion of the water at the time of admission, although temperature differentials between the top and bottom of the tank may also be a contributing factor. Not only do these currents tend to maintain the solids in suspension but if the velocity of the incoming feed is not substantially reduced to an absolute minimum, certain portions of the feed may be short-circuited across the sedimentation zone, even to the region of effluent take-off, thus materially reducing the efficiency of the settling apparatus.

An additional limitation that is attendant upon the use of a central feed system, i. e., where a stream of liquid to be clarified by sedimentation is fed to a settling tank upwardly through its bottom and outwardly from a hollow pedestal as is common practice, particularly if the liquid contains its solid impurities in flocculated form, resides in a disintegration of the fragile flocs by sudden changes in velocity of the liquid stream or by the abrupt encountering of any obstruction.

It follows therefore that one of the primary problems associated with settling apparatus of this character is to effectively dissipate the velocity or energy of the incoming feed and that an almost equally important problem is to direct the deenergized feed into the clarification zone at a uniform low velocity while at the same time avoiding undue retention of solids which would ordinarily commence to settle out immediately upon dissipation of the energy of the incoming feed.

Various attempts have been made to solve this problem of effectively reducing the velocity of the incoming feed to a negligible minimum while at the same time avoiding undue retention of solids and consequent undesirable putrefaction of the sedimentary matter and these attempts have met with only partial success. One widely used method of combating the problem has been the use of baffles or grids which are interposed in the path of the incoming feed. Generally speaking, these baffles or grids, wherever they may be placed, serve only to divert the influent and to change its direction without materially reducing its velocity. In many instances the influent continues to flow unabated in the new direction, and in other instances, as for example, where perforated baffles or grids are employed, the components of the broken up stream of influent not only retain substantially the initial velocity of the original stream but reunite and continue on their way unobstructed and with very little modification in the velocity of the initial stream. The use of such baffles or grids is also conducive toward undue retention of portions of the settled solids and consequent putrefaction thereof, especially at or near the base portions of the baffles and in the out-of-the-way hollows or pockets afforded by the baffles where the liquid becomes segregated and allowed to come to a standstill.

The present invention is designed to overcome the above noted limitations that are attendant upon the construction and use of present day settling apparatus and toward this end has for its primary object to dissipate to a very large extent the velocity or energy of the incoming feed, while an equally important object is to direct the thus deenergized feed liquid into the clarification zone or region of the apparatus at a very low velocity. These primary objects of the invention are applicable to and may be attained in connection with numerous types of sedimentation tanks whether the same be of the rectangular type wherein the feed is admitted at one end thereof and caused to flow in a unidirectional manner across the tank to a region of effluent discharge or whether the same be of the circular type outlined above having a peripheral or circumferential effluent discharge region and a central sludge or sediment take-off region. The invention has been illustrated herein in connection with a more or less conventional circular sedimentation tank whose outflow means for effluent is in the form of an overflow launder extending circumferentially around the tank near the top thereof and whose sediment removal means comprises a plurality of travelling radially extending arms that are equipped with raking blades for impelling the sediment slowly inwardly to a central discharge section or sump. It will be understood however that the improved feeding system comprising the present invention is applicable to other types of sedimentation tanks and the same may, with or without substantial modification, be utilized in connection with a large variety of sedimentation apparatus whether the same be circular, square, rectangular or of other shape.

Briefly, the invention is embodied in a circular sedimentation tank having a bottom and upstanding side wall adapted to accommodate a body of liquid under relatively quiescent conditions and provided with a peripheral overflow weir over which clarified supernatant liquor flows as effluent into an overflow launder to subsequently be discharged. The bottom of the tank, preferably adjacent the central portion thereof, is provided with a depressed well or sump for receiving sediment deposited upon the bottom of the tank, otherwise known as sludge. Means are provided for impelling the settled sludge toward the central portion of the tank bottom and directing it generally toward the sump from which it may be withdrawn, continuously or intermittently as desired, through a suitable discharge conduit. The sludge impelling means preferably is in the form of radially extending arms provided with curved rake blades which, incident to rotation of the arms, continuously impel the sludge toward the center of the tank and eventually into the sump.

The novel features of the present invention reside in an improved and highly efficient and economical arrangement for conducting, distributing and delivering the feed liquid into the body of the tank. The novel principle involved consists first in distributing the feed liquid circumferentially around the tank periphery at a region which is very near the plane of actual feed introduction into the tank and which is preferably slightly thereabove. This distribution is accomplished by the provision of a peripheral feed channel or chamber extending around the tank and located in a plane slightly above the plane of actual feed distribution. Secondly, from this circular feed channel or compartment which is constantly supplied with liquid feed material, a downward discharge of the liquid is effected at spaced points through relatively small orifices into an underlying and substantially coextensive circular secondary chamber the function of which is primarily one of energy absorption or equilization wherein the velocity of the liquid feed is very materially reduced. The secondary chamber which is of circular design may well be referred to as an "equilibration chamber" and is provided with a relatively flat bottom which is substantially a continuation of the bottom floor of the sediment tank. The walls of this equilibration chamber extend substantially vertically and the tank is thus approximately rectangular in cross section and, since the introduction of liquid into this chamber is through the relatively small orifices downwardly thereinto, the entire circular chamber to a certain extent offers to the incoming feed the same function that would be offered by a cup-shaped baffle into whose open side the incoming feed were directed. Thus, because of the relatively high vleocity of the liquid feed entering the equilibration chamber through the circumferentially spaced annular series of openings, a considerable portion of each of the jets of liquid issuing therefrom is caused to double back so that in each instance there are two stream portions, one a reflected stream portion and the other a direct stream portion, effecting mutual reduction of each other's velocity. In addition to this initial change of direction and velocity of the incoming stream of liquid feed, a secondary change of direction and velocity of the reflected stream takes place as it encounters the upper horizontal wall of the equilibration chamber in which the feed openings are provided.

After the liquid feed which is continually introduced into the equilibration chamber has been allowed to thus dissipate its velocity, it is directed radially inwardly of the sedimentation tank at the periphery thereof in a direction which is substantially at right angles to the directions of surge within the equilibration chamber. The net result of this is to "crowd," so to speak, the liquid out of the circular equilibration or surge chamber so that its flow thereafter is entirely lethargic albeit gently directed or impelled inwardly of the sedimentation zone of the tank toward the central discharge sump for sediment. To make possible this release of the more or less quiescent or stilled liquid from the equilibration chamber, a relatively large opening is provided in the inner wall of the latter or, alternatively, a number of small openings the cross sectional areas of which additively cooperate to make up in effect a large area for release of the liquid are provided.

According to one embodiment of the invention, a large release area for the quiescent liquid is afforded by terminating the inner wall of the equilibrium chamber short of the bottom of the sedimentation tank preferably coextensively around the periphery thereof thereby creating an apron under which the released liquid may flow inwardly of the sedimentation tank in close proximity to the bottom thereof. An annular upstanding wall or flange extends upwardly from the bottom of the equilibration chamber and, in combination with the aforementioned apron or inner wall, provides an outlet for the stilled liquid in the form of a continuous slot that gives to the released liquid a generally radial directional characteristic having a downward component so that the liquid is released very near the bottom of the sedimentation tank and at the periphery of the latter and caused to move radially inwardly of the same.

In the accompanying drawings forming a part of this specification, one embodiment of the invention in which the desired conditions of (1) initial feed distribution about the periphery of a sedimentation tank, (2) energy absorption within the distributed liquid to reduce the velocity thereof, and (3) feed placement of the stilled liquid within the sedimentation tank proper as outlined in the above brief description of the invention has been illustrated.

The embodiment has been chosen mainly for illustrative purposes as it will be understood that with various other types of sedimentation tanks which may or may not be of circular design, suitable modifications may be resorted to without departing from the spirit of the invention.

In the drawings.

In all of the above described views, like characters of reference are employed to designate like parts throughout.

Figure 1:
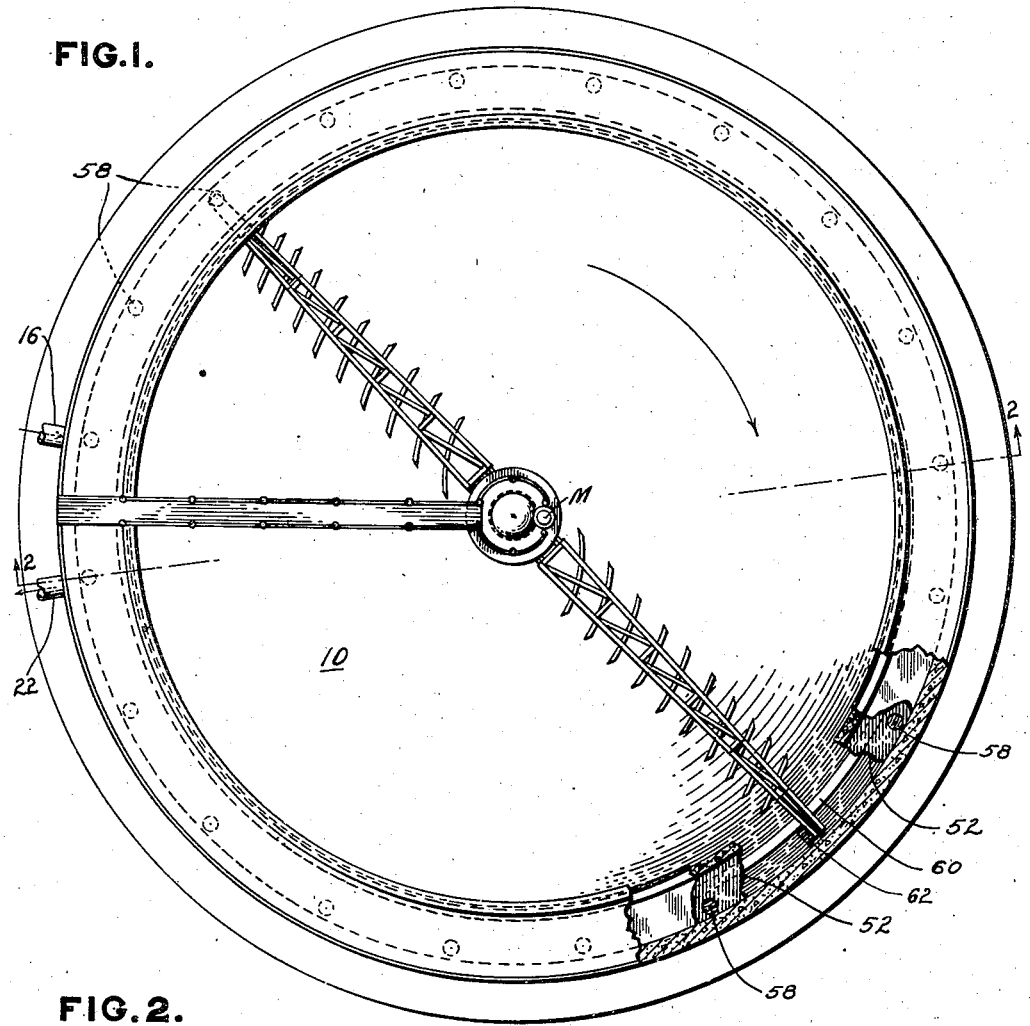
Fig. 1 is a top plan view of a sedimentation tank constructed in accordance with the principles of the present invention. In this view certain parts have been broken away and shown in section to more clearly illustrate the nature of the invention.

Referring to the drawings in detail, the reference character 10 indicates a sedimentation tank which, as illustrated, is generally in the form of a clarifier of the Dorr type, having a bottom 12 having a floor portion 17 which slopes slightly toward the center, and an upstanding peripheral marginal wall 14. Incoming feed liquid enters the tank through a supply pipe 16 which passes through the wall 14 and is distributed around the periphery of the tank preparatory to being released into the same at a comparatively low velocity in a manner that will be made apparent presently as the nature of this invention is better understood. Clarified effluent passes over a weir 18 and into an overflow launder 20 and discharges through a pipe 22, while sludge is collected in a sump 24 and is withdrawn continuously or intermittently through a sludge discharge pipe 26 in a well known manner.

The bottom 12 and peripheral wall 14 are preferably formed of concrete and, extending upwardly from the bottom of the sludge discharge sump 24 centrally of the tank structure, is a base member or pillar 28 likewise formed of concrete and integral with the tank bottom 12. The pillar 28 carries at its upper end a stationary platform or supporting table 30 upon which there is rotatively mounted a turntable 32 adapted to be driven from a motor M supported on an upper platform 34 arranged above the rotatable turntable and suitably supported from the stationary platform 30. The upper stationary platform 34 serves to support the inner end of a walk-way or bridge 36 by means of which access may be had to the motor M and its associated driven instrumentalities.

At suitable intervals about the periphery of the turntable 32 are rigidly attached depending carriers 38 which, at their lower ends, support a rake-carrying cage or structure 40 to which there is fixedly secured at opposite diametrical points a pair of rake-carrying arms 42 which in turn serve to support a plurality of sediment raking blades 44. The blades 44 are disposed at an angle to the rake-carrying arms 42 in such a manner that, upon rotation of the latter about the central pillar 28 in the direction indicated by the arrows in Figure 1, sedimented material will be impelled toward the center of the tank and ultimately deposited in the sump 24.

The Scott Reissue Patent Re. #20,072, dated August 18, 1936, is referred to as illustrative of the manner by which the sediment raking mechanism may derive support from the pillar 28 and also of the mechanism by which the raking mechanism may be actuated.

The arrangement of parts thus far described (except for the brief mention made of the distribution of liquid feed material about the periphery of the tank 10 preparatory to feed introduction into the settling zone proper) is purely conventional in its design and no claim is made herein to any novelty associated with the same, the novelty of this invention residing rather in the arrangement for distributing the liquid feed for the sedimentation tank preparatory to its introduction into the latter and the subsequent introduction thereof as will now be more fully described and claimed.

Figure 2:
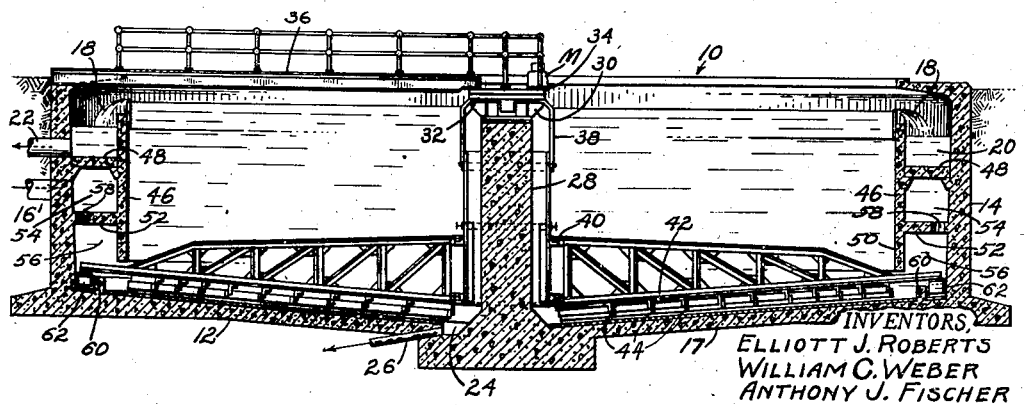
Fig. 2 is a vertical sectional view of the tank taken substantially along the line 2—2 of Fig. 1. In this figure certain raking mechanism employed in the tank is shown as being positioned along said line 2—2.

Referring now to Figure 2, it will be seen that the overflow launder 20 exists by virtue of the outer peripheral wall 14 and an inner partition wall 46 which extends from a region spaced slightly above the bottom of the tank 10 to a region adjacent the top thereof. A horizontal elevated ring-like partition or shelf 48 extends between the inner and outer walls 46 and 14 and provides a bottom for the overflow launder. A second ring-like partition 52 extends across the space existing between the two walls 46 and 14 below the partition 48 and thus a hollow ring-like distribution chamber or channel 54 is created between and is bounded by the walls 46 and 14 and the partitions 48 and 52 and is situated directly below the overflow launder 20 coextensively therewith.

The feed supply pipe 16 (Figures 1 and 2) extends through the outer wall 14 of the sedimentation tank 10 at one side thereof and communicates with the interior of the distribution chamber or channel 54. Liquid feed entering the distribution chamber 54 through the feed pipe 16 is conducted around the tank 10 in the peripheral regions thereof and is thus, at least to a certain extent, distributed peripherally thereof prior to actual introduction into the tank.

Figures 3, 4:
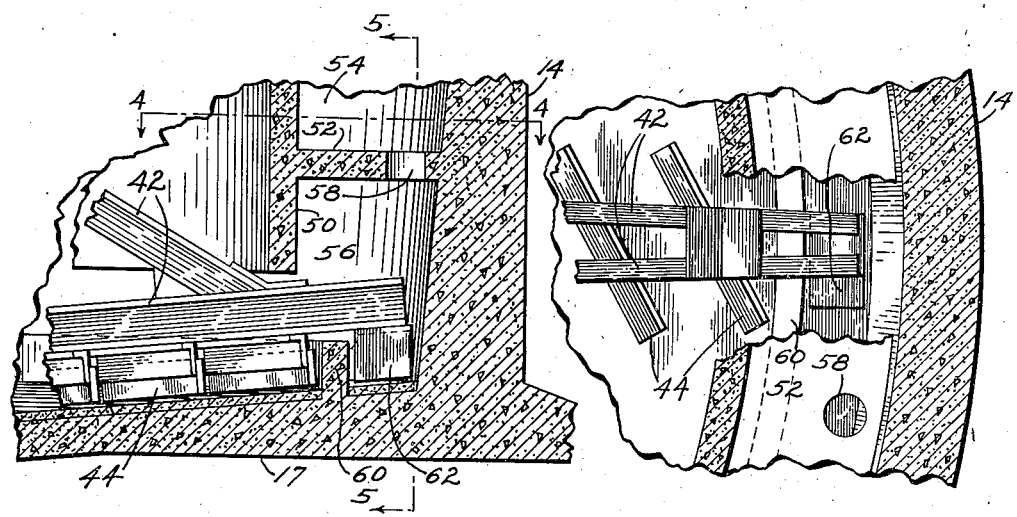
Fig. 3 is an enlarged detailed fragmentary vertical sectional view taken substantially along said line 2—2 of Fig. 1 and with the end portion of the raking mechanism shown as positioned along said line 2—2.
Fig. 4 is a horizontal sectional view taken substantially along the line 4—4 of Fig. 3. In this view certain parts have been broken away to more clearly reveal the nature of the invention.

Still referring to Figure 2 and also to Figure 3, the partition 52 which forms the bottom wall for the distribution chamber 54 is spaced upwardly from the extreme bottom wall 12 of the tank 10. The vertical partition wall 46 extends downwardly as at 50 beyond the horizontal partition 52 and, in conjunction with the outer wall 14, bottom wall 12 and partition 52, defines a ring-like energy-absorbing or equilibration chamber 56 which communicates with the distribution chamber 54 immediately thereabove by means of a plurality of circumferentially spaced openings 58 extending through the partition 52.

Extending upwardly from the floor 17 of the sedimentation tank 10 in the peripheral regions thereof is a continuous circular narrow flange or baffle 60. This latter baffle is of relatively small height and extends around the floor 17 at a region which is located medially between the inner and outer walls 46 and 14. The baffle 60 is of less height than the vertical distance from the floor 17 to the lower edge of the apron-like portion 50 of the partition wall 46 and cooperates with the latter, by virtue of its height and outward spacing therefrom, to provide in effect a discharge opening for the equilibration chamber 56 in the form of a continuous slot 61 or opening having effective directional components of liquid release which direct the liquid feed issuing from the chamber 56 inwardly of the sedimentation tank and downwardly toward the bottom thereof.

The rake-carrying arms 42 extend at their outer ends under and beyond the partition wall 46 and into the equilibration chamber 56 and each arm carries at its outermost extremity a single rake or scraper 62 the function of which is to maintain the narrow channel existing between the baffle 60 and outer wall 14 clear of large solids and smaller sedimentary material. This scraper 62 is preferably at an angle from the vertical to assist in lifting or plowing deposited solids over the baffle 60 into the main body of the tank 10.

In sedimentation apparatus of this character, because of the relatively vast area of the sedimentation zone, relatively high velocities must be employed in the feed pipe 16 if the apparatus is to operate at maximum capacity. For this reason, the feed liquid enters the initial distribution chamber 54 in a state of turbulence and flows or surges in opposite directions circumferentially around the tank 10 likewise at a relatively high velocity so that good circumferential distribution may be obtained. The hydrostatic pressure of the liquid built up in the primary distribution chamber 54 is thus sufficiently great that any release of the liquid directly into the sedimentation tank would create a jet effect of sufficient velocity to cause portions of the feed to carry completely across the sedimentation zone even to the point of sediment removal thus creating eddy currents and otherwise disturbing the settled sludge in its path while at the same time leaving in its wake barren areas or regions and otherwise upsetting the normal functioning of the apparatus. While it is true that by increasing the number of release points or openings and properly spacing them or even by releasing the liquid from the initial distribution chamber coextensively around the periphery of the tank in the form of a thin continuous ribbon would to a certain extent decrease the velocity of the feed as it entered the tank proper, such release thereof would be far from uniform in all the peripheral regions of the tank. Because of the turbulence and high velocity of the liquid in the distribution chamber adjacent the feed pipe 16, the jet effect would be relatively great adjacent the latter and would progressively decrease at points further removed from the feed pipe. Even if this problem of unven distribution of liquid and of uneven pressure regions were effectively overcome, experience has shown that fluid velocities cannot be effectively reduced merely by changing the direction of flow of the fluid, especially when in back of the fluid there is maintained an oncoming reserve of the fluid at a high velocity. Thus, allowing for a small amount of velocity reduction due to a general widening or increasing of the overall combined area of the fluid admitting openings or ports, the velocity of the liquid admitted to the sedimentation tank proper directly from the distributing chamber 54 would, in any event, be sufficiently high as to offset conditions of settling at least in the outer regions of the tank if not over the entire settling area thereof.

The function of the equilibration chamber 56 therefore is, as the name implies, to cause the fluid contained within this chamber to dissipate its energy within itself and reduce its velocity to a negligible minimum before being released into the sedimentation tank proper and also to direct this fluid, when released, gently inwardly of the tank in a radially downward direction coinciding with the direction of movement of the sludge or sediment toward the central discharge for the latter. Toward this end, the various openings 58 which extend through the partition 52 for the purpose of admitting the feed into the equilibration chamber are located substantially centrally between the vertical projection of the baffle 60 and the outer wall 14 (see also Figure 7) and because of this fact the baffle and wall, together with a portion of the bottom wall of the chamber provide in effect a cup-shaped baffle arrangement into which the fluid jets of liquid feed are directed. Because of this cup-shaped baffle arrangement, the jets of liquid feed are reversed upon themselves or, more descriptively, turned inside out so that there is an outer envelope of fluid moving upwardly past each downwardly directed jet and the two streams of liquid offer a certain amount of mutual interference, each to the movement of the other. The upwardly moving stream or envelope of fluid upon approaching the top wall 52 of the chamber 56 is again deflected downwardly and, in theory, this process is repeated indefinitely with the net result that the various up-moving and down-moving streams comingle indiscriminately and are shifted or crowded, so to speak, inwardly toward the apron wall 50 where there exists a region of comparative quiescence on the inner side of the baffle member 60, i. e., on the side of the baffle 60 nearest the center of the sedimentation tank.

Inasmuch as there is a material amount of so-called energy absorption within the fluid itself in the region of the jets on the outer side of the baffle 60, some of the heavier sedimentary particles settle out immediately and lodge within the trough existing between this baffle and the outer wall 14. By the same token, and by virtue of the fact that the region on the inner side of the baffle 60 is one of comparative quiescence, some of the less heavy particles settle out on the extreme peripheral regions of the bottom of the tank proper and immediately commence their slow inward movement as impelled by the rake blades 44.

In order to rid the trough existing on the outside of the baffle 60 of sedimentary material which upon undue retention thereof would lead to the septic conditions previously outlined, and also in order that the baffle member 60 may retain its function as such in creating the jet reversal conditions within the equilibration chamber 56, the rake elements 62 serve to sweep this trough or channel periodically and keep the same clear of sedimentary material by impelling the latter over the baffle or wall 60 to a region within the effective sweep of the rake members 44.

It will be seen from the above description that both the heavier particles which immediately settle out on the outer side of the baffle 60 and the less heavy particles which settle out on the inner side of the baffle within the equilibration chamber 56 are carried together underneath the apron portion 50 of the partition wall 46 where their movement inwardly of the sedimentation tank along the bottom thereof toward the sludge discharge sump 24 is continued uniformly by virtue of the rakes 44. The remainder of the feed liquid is crowded, in the manner previously explained, at a very low velocity out of the equilibration chamber beneath the apron 50 with insufficient velocity to disturb the solids that may be said to have presettled in the equilibration chamber.

This method of feeding is particularly advantageous in the case of materials that ordinarily would tend to plunge to the bottom of the settling zone if fed thereinto by the conventional center feed system wherein the feed liquid is introduced above the floor of the tank. In such instances this plunging of the material sets up reverse eddy currents and makes a large portion of the tank volume ineffective. This plunging of material may be due inherently to the presence of unusually large particles of the sedimentary material having a much higher specific gravity than that of the liquid or it may be due, as in the case of activated sludge where the specific gravity of the material is only slightly higher than that of the surrounding liquid, to temperature or other considerations. Whereas in such instances the function of the raking mechanism is very materially restricted, in the present instance where the liquid feed material is directed inwardly of the sedimentation zone at the periphery thereof and near the bottom of the tank its direction of flow actually will assist in the raking function.

Figure 5:
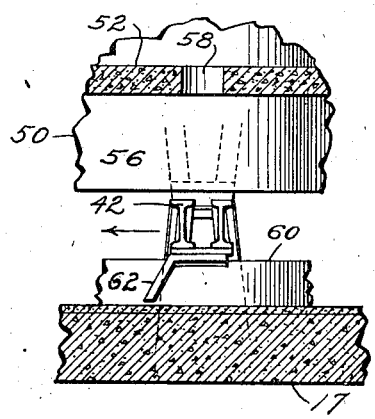
Fig. 5 is a vertical sectional view showing the movable end and outer blade of the raking mechanism and the position thereof relative to certain other marginal portions of the tank structure.

The present system of feeding the liquid material is of further advantage over other systems commonly employed in that it promotes flocculation or that property exhibited by colloids of aggregating or gathering together to form much larger bodies or flocs which readily settle to the bottom of the sedimentation tank. This is particularly important in the case of dilute suspensions such as sewage. Since in the present instance the fresh feed is introduced under relatively quiet conditions, and furthermore under conditions of complete submergence near the bottom of the tank and over the full peripheral area thereof, while the clarified effluent is taken off likewise over the full peripheral area of the tank at the top thereof, a uniform and generally vertical flow condition obtains for the partially clarified and the fully clarified liquid which is diagrammatically illustrated by the arrows in Figure 5. This is desirable in that the coarser flocculated particles are inclined to lag behind the liquid flow and settle countercurrently to the vertically rising liquid. This phenomenon that is inherent in the present system is conducive toward a bringing together mechanically the retarded partially flocculated particles and the vertically rising particles to promote increased flocculation. Such increase in flocculation as is obtained by virtue of the phenomena just described is necessarily obtained during conditions of as near quiescence as possible. Flocculation of this sort is relatively unstable since the particles are extremely fine and delicate and do not become closely knit together. It will be seen therefore that the conditions requisite to this type of flocculation, which in reality is a final or cleaning up stage in the flocculating process, are a relative movement or counterflow between the partially flocculated particles and the partially clarified liquid and a condition very nearly approaching absolute quiescence. Both of these conditions are obtained by the present feeding process outlined above.

In addition to promoting flocculation in its final stages, the present arrangement of velocity reduction and peripheral feed also promotes initial flocculation by promoting a certain amount of preflocculation within the equilibration chamber 56 and in the extreme peripheral regions of the settling zone. It has been pointed out by reference to Figure 7 that a relatively quiescent zone for the stilled liquids exist within the equilibration chamber 56 on the side of the flange or baffle 60 nearst the depending apron 50. While substantially all of the energy or velocity of the liquid feed has been destroyed in this region or zone, a certain amount of indiscriminate circulation or eddying occurs. In the case of dilute suspensions such as sewage, initial flocculation as distinguished from the more delicate final flocculation just described may be accelerated by moderate agitation since the particles are more stable and once they have been brought together by collision, mild though it may be, unite relatively firmly and thereafter follow the laws of mass subsidence. While the more violent agitation that occurs in the distribution chamber 54 prior to entry of the liquid feed into the equilibration chamber 56 will not promote fluocculation and may even prevent it, and while there may be little or no flocculation in the less quiescent regions of the equilibration chamber on the outer wall side of the baffle 60, the relatively quiescent conditions on the apron side of this baffle will permit of and even promote preflocculation immediately prior to movement of the liquid into the the settling zone of the sedimentation tank.

The present invention therefore is conducive toward both initial flocculation and final flocculation, both of which phenomena are important contributory factors toward efficient settling.

Figure 6:
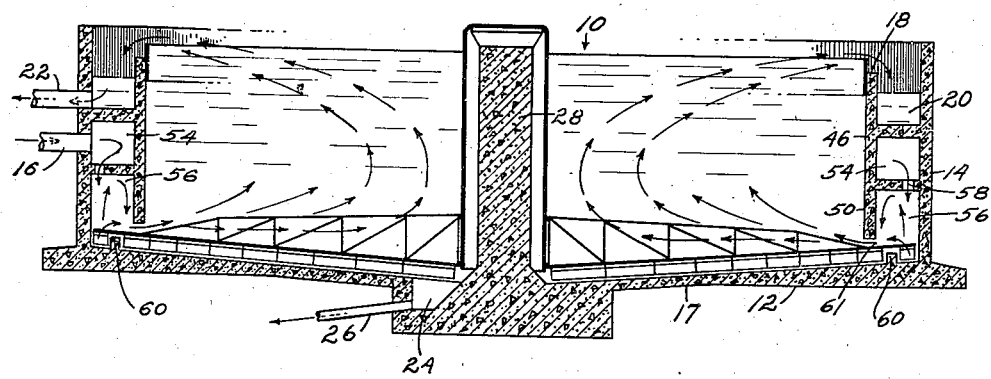
Fig. 6 is a sectional view similar to Fig. 2 but more or less schematic in its representation and illustrating the manner in which liquid to be purified is introduced into the apparatus, the flow path of liquid across the settling zone proper and the removal of clarified liquid from the apparatus.
Figures 7, 9:
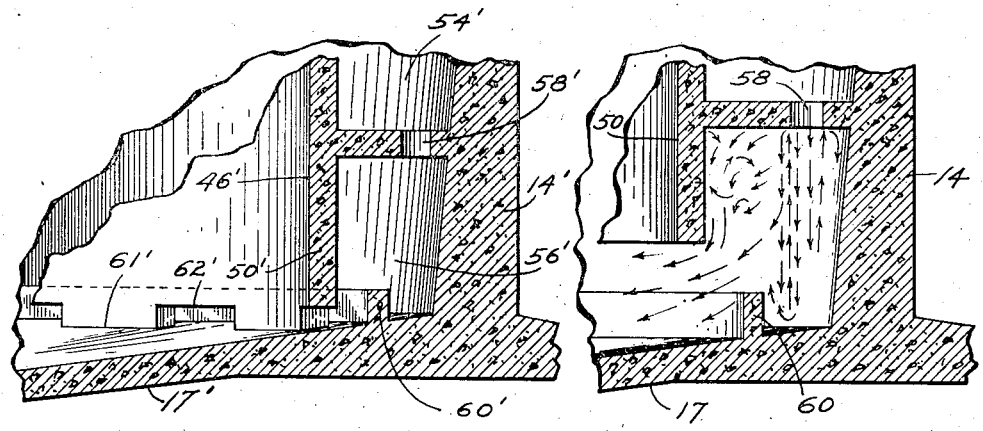
Fig. 7 is a fragmentary vertical sectional view indicative of a modified form of liquid release arrangement for the tank.
Fig. 9 is a schematic fragmentary sectional view of the equilibration chamber illustrating the manner in which energy absorption takes place internally within the liquid feed introduced thereinto.

In Figure 7 there is disclosed a slightly modified form of the invention in which the essential features of the invention, i. e., distribution of the initial liquid circumferentially about the periphery of the sedimentation tank, energy absorption of the liquid, and finally, placement of the stilled liquid into the peripheral regions of the tank proper, have been preserved. In this form of the invention shown, no substantial alteration has been made in the arrangement of the feed distribution channel or chamber 54' and the energy absorption or equilibration chamber 56' has been modified by extending downwardly the lower section 50' of the wall 46' and by continuing downwardly certain horizontally spaced portions thereof as at 61' to meet the bottom 17' of the sedimentation tank. Between these spaced portions 61' there are left slots 62' which are relied upon to release the liquid feed which has been rendered substantially quiescent in the equilibration chamber 56'. These slots 62' are preferably left in the wall 50' near the bottom thereof so that the liquid may be crowded out of the equilibration chamber in the manner previously described. The raking structure extends outwardly to a region close to the wall 50' but does not extend through the wall. Otherwise the construction and operation of the apparatus remains substantially as described in connection with the form of the invention shown in Figures 1 to 5 inclusive and further schematically illustrated by Figures 6 and 9.

Figure 8:
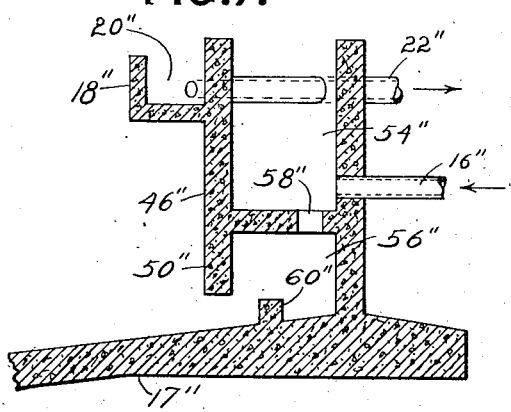
Fig. 8 is a fragmentary vertical sectional view indicative of a modified form of influent receiving and release structure and of associated effluent launder structure.

In Fig. 8 a still further modified form of the invention is shown wherein the overflow launder 20" is disposed on the inner side of the inner wall 46", thus enabling the upper end of the annular feed distribution chamber 54" to be left open. Also by such an arrangement the depth, and consequently the capacity, of the feed distribution chamber may be materially increased. The arrangement of the equilibration chamber 56", including the upstanding flange 60" and the depending portion 50" of the wall 46", remains substantially the same as in the form of the invention shown in Figures 1 to 6 inclusive and the distribution of fluid therein after entering through the openings 58" under the influence of the hydrostatic head of liquid in the upper feed distribution chamber 54" is not materially altered. Liquid which has been clarified and which passes over the overflow weir 18" into the launder 20" is withdrawn by means of a discharge conduit 22" while fresh feed enters the system by means of a conduit 16". In this form of the invention the raking mechanism (not shown) may be extended ino the space behind the flange 60" to maintain this space clear of settled matter as previously described and also, access is readily had to the interior of the feed distribution chamber 54" for the purpose of removing matter which may lodge on the bottom thereof.

In the forms of the invention described above, the relative size of the feed distribution chamber or channel and of the equilibration chamber, as well as the overall area afforded by the openings between these chambers and also the overall area afforded by the outlet space or spaces leading into the sedimentation tank proper from the equilibration chamber are designed in accordance with engineering exigencies to obtain maximum efficiency. No specific dimensions or proportions have been set forth herein as being critical but in general it may be stated that the cross sectional area of the feed distribution channel and the number and size of the openings leading into the equilibration chamber should be so related to the volume of the feed supply intended to be handled by the sedimentation apparatus that a brisk velocity is maintained therein to avoid any unwarranted presettling in this region. Also the agggregate size of the outlet or outlets leading from the energy absorbing equilibration chamber should be sufficient that an hydrostatic head is not set up to nullify, by a jet effect leading into the sedimentation tank proper, the functions accomplished in this former chamber. Bearing these general conditions in mind, various changes in the details of construction both as to size and proportion as well as to function may be resorted to without departing from the spirit of the invention.

What is claimed is:

1. In an apparatus for separating suspended solids from liquids by sedimentation, a settling tank providing a substantially circular settling zone and having a bottom, a cylindrical outer side wall, a centrally arranged sediment removal sump, means for moving sediment to the sump, a cylindrical inner side wall spaced inwardly from the outer side wall and concentric therewith, the upper edge of said latter side wall providing an overflow weir for clarified liquid, a horizontal partition extending between said walls and forming in combination with the same an overflow launder for clarified liquid, a second horizontal partition extending between said walls below said first mentioned partition and defining in combination with said walls and partition an annular feed distribution channel, and a feed pipe communicating with the interior of said channel for the introduction of liquid feed thereinto, said latter partition being spaced above the bottom of the tank and, in combination with the side walls and bottom defining an annular equilibration chamber beneath said distribution channel, there being an annular series of spaced openings in said latter partition establishing communication between the feed distribution channel and the equilibration chamber, there being an opening in said inner side wall establishing communication between the equilibration chamber and the peripheral regions of said settling zone adjacent the bottom of the tank for egress of liquid feed from the equilibration chamber to said settling zone.

2. In an apparatus for separating suspended solids from liquids by sedimentation, a settling tank providing a substantially circular settling zone and having a bottom, a cylindrical outer side wall and a centrally arranged sediment removal sump, means for moving sediment to the sump, a cylindrical inner side wall spaced inwardly from the outer side wall and concentric therewith, the upper edge of said latter side wall providing an overflow weir for clarified liquid, a horizontal partition extending between said walls and forming in combination with the same an over flow launder for clarified liquid, a second horizontal partition extending between said walls below said first mentioned partition and defining in combination with said walls and partition an annular feed distribution channel and a feed pipe communicating with the interior of said channel for the introduction of liquid feed thereinto said latter partition being spaced above the bottom of the tank and, in combination with the side walls and bottom defining an annular equilibration chamber beneath said distribution channel, there being an annular series of spaced openings in said latter partition establishing communication between the feed distribution channel and the equilibration chamber, said inner wall terminating short of the bottom of said tank to provide a continuous opening around the peripheral regions of the settling zone for egress of liquid from the equilibration chamber into the settling zone adjacent the bottom of the tank.

3. In an apparatus for separating suspended solids from liquids by sedimentation, a settling tank providing a substantially circular settling zone and having a bottom, a cylindrical outer side wall and a centrally arranged sediment removal sump, means for moving sediment to the sump, a cylindrical inner side wall spaced inwardly from the outer side wall and concentric therewith, the upper edge of said latter side wall providing an overflow weir for clarified liquid, a horizontal partition extending between said walls and forming in combination with the same an overflow launder for clarified liquid, a second horizonal partition extending between said walls below said first mentioned partition and defining in combination with said walls and partition an annular feed distribution channel, a feed pipe communicating with the interior of said channel for the introduction of liquid feed thereinto, said latter partition being spaced above the bottom of the tank and, in combination with the side walls and bottom defining an annular equilibration chamber beneath said distribution channel, there being an annular series of spaced openings in said latter partition establishing communication between the feed distribution channel and the equilibration chamber, said inner wall terminating short of the bottom of said tank to provide a continuous opening around the peripheral regions of the settling zone for egress of liquid from the equilibration chamber into the settling zone adjacent the bottom of the tank and a relatively short baffle extending upwardly from said bottom within the equilibration chamber medially between the inner and outer walls.

4. In an apparatus for separating suspended solids from liquids by sedimentation, a settling tank providing a substantially circular settling zone and having a bottom, a cylindrical outer side wall and a centrally arranged sediment removal sump, means for moving sediment to the sump, a cylindrical inner side wall spaced inwardly from the outer side wall and concentric therewith, the upper edge of said latter side wall providing an overflow weir for clarified liquid, a horizontal partition extending between said walls and forming in combination with the same an overflow launder for clarified liquid, a second horizontal partition extending between said walls below said first mentioned partition and defining in combination with said walls and partition an annular feed distribution channel, a feed pipe communicating with the interior of said channel for the introduction of liquid feed thereinto, said latter partition being spaced above the bottom of the tank and, in combination with the side walls and bottom defining an annular equilibration chamber beneath said distribution channel, there being an annular series of spaced openings in said latter partition establishing communication between the feed distribution channel and the equilibration chamber, said inner wall terminating short of the bottom of said tank to provide a continuous opening around the peripheral regions of the settling zone for egress of liquid from the equilibration chamber into the settling zone adjacent the bottom of the tank, a relatively short baffle extending upwardly from said bottom within the equilibration chamber medially between the inner and outer walls, a movable rake member disposed in said equilibration chamber in contact with said bottom on the outer side of said baffle, and means for causing said member to traverse the annular space between the baffle and said outer wall.

5. Sedimentation apparatus comprising a settling tank having a bottom, a marginal wall, means for removing sediment from the bottom, combined means providing three superposed channels with a common dividing member between each adjacent pair and of which the uppermost channel is liquid-receiving at its top while the other two are in hydraulic communication with each other and with the liquid of the tank, means for discharging effluent from the tank including the uppermost channel, and means for feeding the tank including the other two channels.

6. Apparatus according to claim 5 wherein a unitary partitional wall forms one side of all three channels and a portion of the marginal wall forms another side of all three channels.

ELLIOTT J. ROBERTS.
    WILLIAM C. WEBER.
    ANTHONY J. FISCHER.